United States Patent [19]

Althouse et al.

[11] E Patent Number: Re. 33,153

[45] Reissued Date of Patent: Jan. 23, 1990

[54] SOLDERLESS MOUNTED FILTERED CONNECTOR

[75] Inventors: Rickie M. Althouse, Harrisburg; Robert E. Beamenderfer, Palmyra; Roger W. Durbin, Lancaster; Robert D. Hollyday, Elizabethtown; John P. Kling, Mount Joy, all of Pa.

[73] Assignee: AMP Incorporated, Harrisburg, Pa.

[21] Appl. No.: 56,937

[22] Filed: May 27, 1987

Related U.S. Patent Documents

Reissue of:

[64] Patent No.: 4,519,665
Issued: May 28, 1985
Appl. No.: 562,638
Filed: Dec. 19, 1983

[51] Int. Cl.[4] ..... H01R 13/648; H01R 13/66

[52] U.S. Cl. ..... 439/608; 439/620

[58] Field of Search ..... 434/607, 609, 608, 610, 434/620; 333/183, 185, 182, 184

[56] References Cited

U.S. PATENT DOCUMENTS

| | | | |
|---|---|---|---|
| 3,648,222 | 3/1972 | Cowmeadow | 439/620 X |
| 3,743,979 | 7/1973 | Schor | 439/620 X |
| 4,029,386 | 6/1977 | Krantz et al. | 439/620 X |
| 4,260,966 | 4/1981 | Boutros | 439/608 X |
| 4,276,523 | 6/1981 | Boutros et al. | 439/607 X |

*Primary Examiner*—Eugene F. Desmond
*Attorney, Agent, or Firm*—Katherine A. Nelson

[57] ABSTRACT

A solderless filtered connector is formed by a first insulative housing which is selectively plated with conductive material and is profiled to receive therein a second insulative housing carrying a plurality of filtered terminals in a spaced array. Ground is established by a multi-apertured grounding member which receives the respective filter sleeves therein and is profiled to make wiping engagement with the plated portion of the first housing. A metal shell secured to the first housing defines a mating face for the connector and completes the ground path. Each terminal has a compliant intermediate portion which is received in the bore of a respective filter sleeve to make solderless engagement therewith.

10 Claims, 3 Drawing Sheets

54
58
56
18
26
12
24
60
63
64
67
20
66
68
62
65
69
48
52
16
14
70
22
10

SOLDERLESS MOUNTED FILTERED CONNECTOR

Matter enclosed in heavy brackets [ ] appears in the original patent but forms no part of this reissue specification; matter printed in italics indicates the additions made by reissue.

The present invention relates to a filtered electrical connector and, in particular, to a connector which obviates the requirement for the use of solder in assembly.

Filtered electrical connectors are quite well known, both in their individual components and in the general structural arrangement. However, most of the prior filtered connectors has had a requirement for the use of solder in at least some portion of the assembly. Either solder was required to make the inner connection between the pin terminal and the interior of the filter sleeve or between the exterior of the filter sleeve and a ground plane. This requirement caused a certain amount of difficulty both in assuring proper contact between the filter and its associated members and in the repair and/or replacement of a completed soldered filtered assembly.

Filter sleeves, filtered terminals, and filtered connectors are well known. A typical coated ferrite RF filter sleeve is disclosed in U.S. Pat. No. 3,743,978 and U.S. Pat. No. Re. 29,258. The typical use of such filter sleeves is with a pin terminal passing through and soldered to the bore with the sleeve terminal assembly soldered by the outer sleeve surface into a hole in a metal ground plane. Examples of this type of use can be found in U.S. Pat. Nos. 3,961,294; 4,215,326 and 4,265,506. While this is the most common type of mounting, it causes a number of manufacturing problems. First, it is labor intensive and not readily adaptable to automation, second, the soldering operation can generate sufficient heat to destroy the filters, third, it is substantially impossible to test the filters and/or the connector until after complete assembly, and finally, it is quite difficult to repair such an assembly. In the case of repair, the malfunctioning filter must first be identified, the solder reheated to remove the bad filter and reheated a second time to insert the replacement. While this type of repair is possible, it requires a highly skilled operator in order to prevent damage to surrounding filters during both solder reheating operations. Clearly this is both labor intensive and not readily adaptable to automation.

Attempts have been made to develop solderless ways in which to mount filter sleeves on pin terminals and in ground planes. These attempts have usually involved the use of inner and/or outer resilient members engaging the respective surfaces of the filter sleeve. Examples of this approach can be found in U.S. Pat. Nos. 3,753,168 and 3,961,295. The major drawback of these approaches has been the large number of parts that are involved and the care necessary for assembly. There is also the problem of the filter sleeves breaking from excessive spring and/or assembly forces.

The present invention overcomes many of the above discussed difficulties of the prior art by providing a completely solderless, filtered electrical connector. The subject connector has a grounding member and a metal shell. The first housing is an elongated member of insulative material defining a rearwardly opening cavity with a plurality of passages extending from the cavity to a forwardly directed mating face. The first housing is plated with a conductive material except for masked portions of the cavity, mating face and passages. The second housing member is also formed of insulative material and defines a like plurality of filter pin assembly passages therein and is profiled to be received in the cavity of the first housing member. The grounding member is formed of resilient conductive material and has a like plurality of apertures therein, each profiled to receive and engage an outer conductive surface of a respective filter sleeve. The metal shell has a shroud enclosing the mating face of the connector. The plurality of filtered terminals each comprises an elongated terminal having a first mating portion, a compliant filter mounting portion, a filter positioning shoulder portion, and a second mating portion, and a filter sleeve of known configuration with a tubular element having conductive inner and outer surfaces.

The present invention will now be described by way of example with reference to the accompanying drawings, in which.

Figure 1:
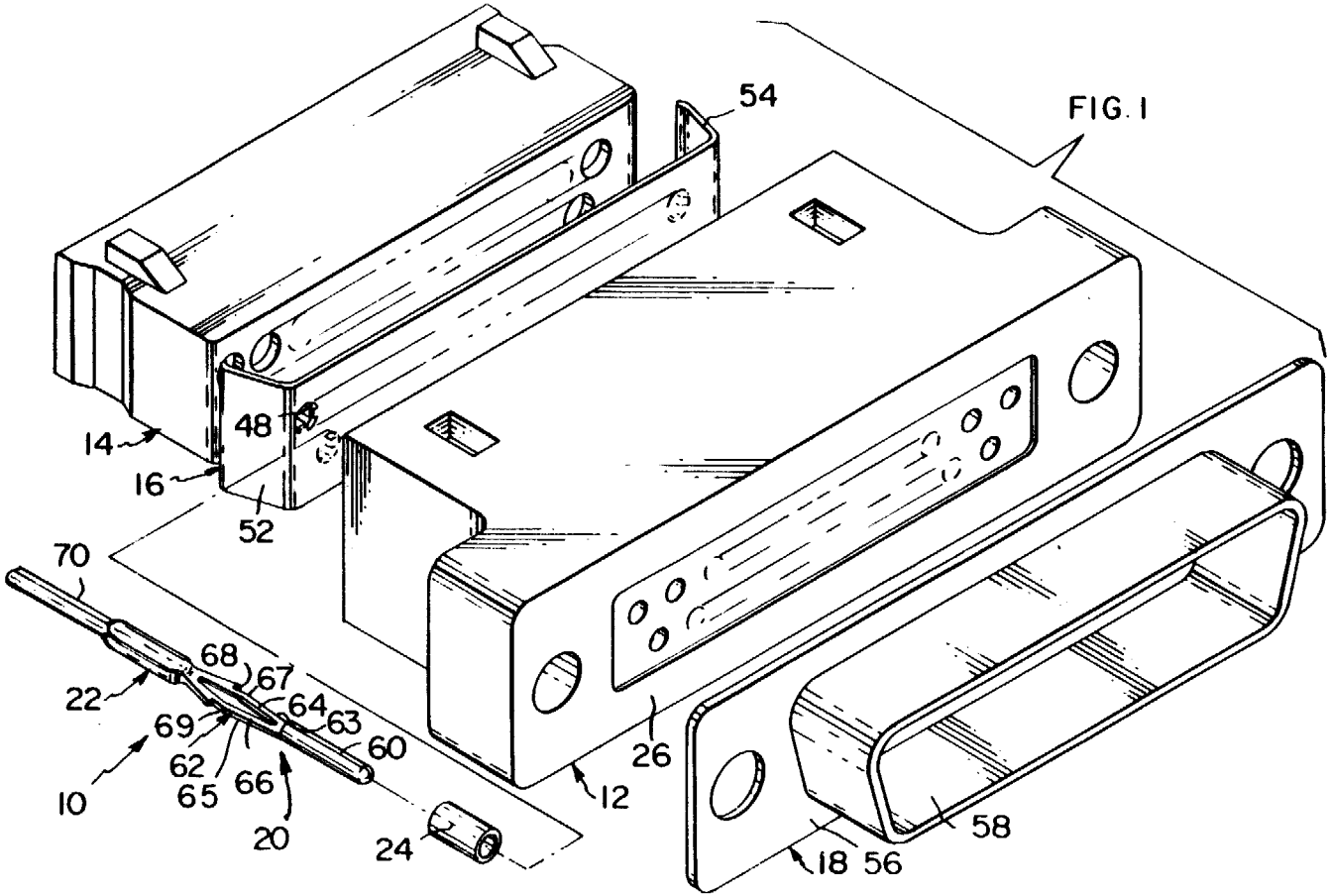
FIG. 1 is an exploded perspective view of the subject invention.

The subject connector 10 has a first housing 12, a second housing 14, a grounding member 16, a metal shell 18 and a plurality of filtered terminals 20 each formed by a terminal 22 and a filter sleeve 24.

The first housing 12 is an elongated member of rigid insulative material defining a mating face 26, a rearwardly opening cavity 28, a patterned array of a plurality of passages 30 extending between the cavity 28 and the mating face 26, and latching openings 32, 34 extending outwardly from opposite sides of the cavity. The first housing 12 is plated with a conductive material 36 except for portions of the cavity 28 and mating face 26 which are masked so that the passages 30 are not plated. The second housing 14 is formed of rigid insulative material with a like patterned array of a plurality of filter passages 38 extending therethrough from a front face 40 to a rear face 42. The second housing 14 is profiled to be received in the cavity 28 of the first housing 12 and includes outwardly directed latching lugs 44, 46.

The grounding member 16 is an elongated piece of resilient conductive material having a like patterned array of a plurality of apertures 48 each profiled by inwardly directed tines 50. The grounding member is formed with a resilient flange 52, 54 at opposite ends thereof.

The shell member 18 is a stamped and formed conductive member having a peripheral mounting flange 56 and an integral shroud 58 which surrounds the mating face 26 of the first housing 12.

Each filtered terminal 20 includes an elongated pin terminal 22 and a filter sleeve 24. Each pin terminal 22 has a first mating end 60, an intermediate filter mounting portion 62 formed by a pair of legs 64, 66, the legs being joined at their ends and bowed in the middle to define a diamond shape opening therebetween, an abutment shoulder 68 and a second mating end 70. *Legs 64, 66 lie in a common plane and include outwardly facing edge surfaces 63, 65, the outer most portions 67, 69 of which extend outwardly beyond the diameter of the first mating end 60.*

Figure 2:
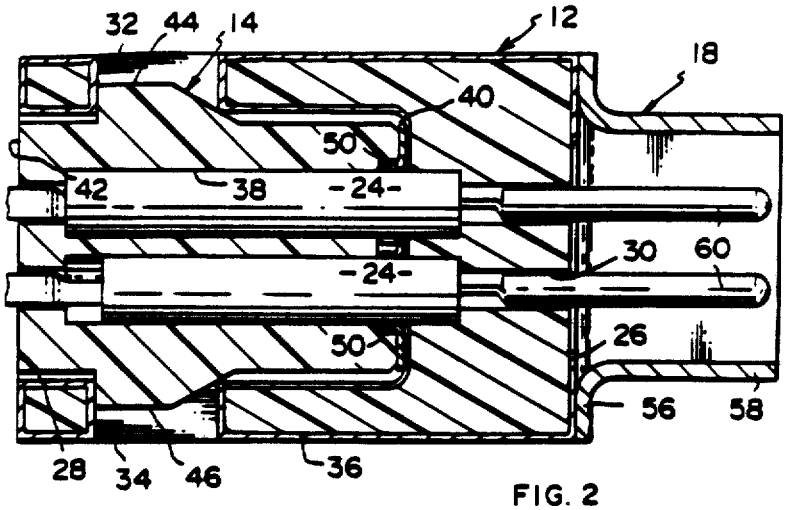
FIG. 2 is a transverse section through the connector of FIG. 1.
Figure 3:
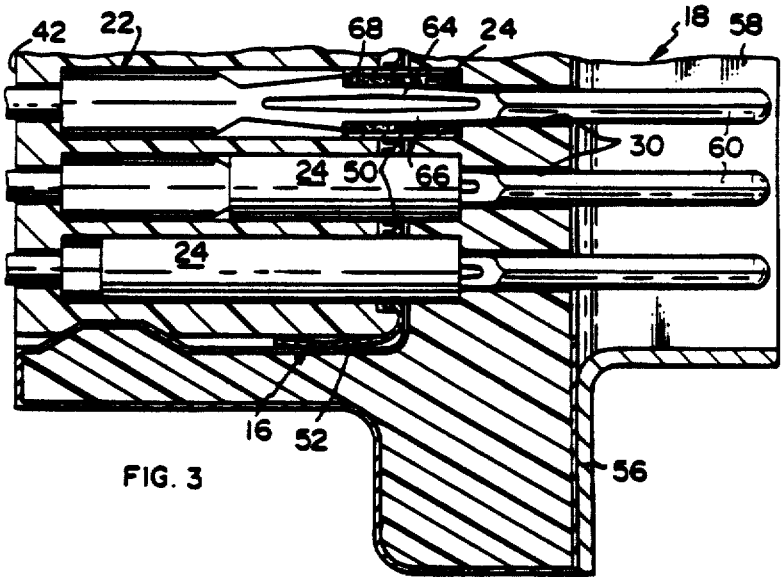
FIG. 3 is a horizontal section through one end of the connector according to the present invention.

The present invention is assembled by first placing the filter sleeves 24 on the respective terminals 22. As the sleeve 24 slides along the legs 64, 66 they are depressed inwardly *in the common plane* and form a wiping contact with the inner conductive surface of the filter sleeve. The sleeve 24 is seated against the shoulder 68. The filtered terminals 20 are then passed through the respective apertures 48 in the grounding member 16 and seated in the passages 38 of the second housing 14. The assembly of the filtered terminals 20, second housing 17 and grounding member 16 is then inserted into the rearwardly directed cavity 28 of the first housing 12 until the lugs 44, 46 engage in the respective openings 32, 34. In this position it will be noted, from FIGS. 2 and 3, that the grounding member 16 assures a good electrical engagement between the plating 36 on the first housing 12 and the respective filter sleeves 24.

Figure 4:
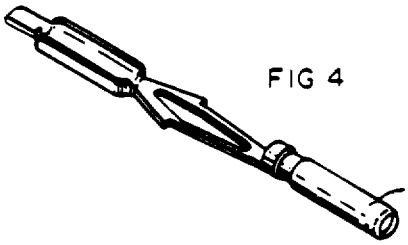
FIG. 4 is a three dimensional fragmentary view of an alternative embodiment of the first mating portion of the terminal.
Figure 4A:
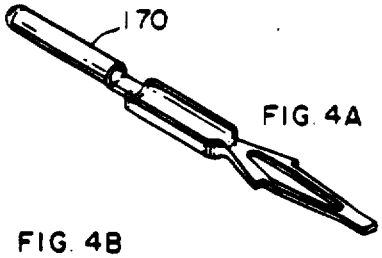
FIGS. 4A–4D are three dimensional fragmentary views of alternative embodiments of the second mating portion of the terminal.
Figure 4B:
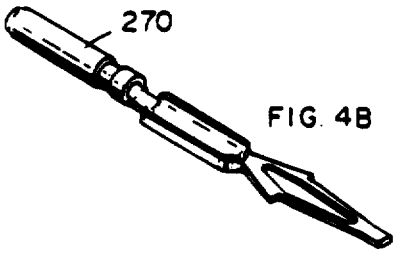
Figure 4C:
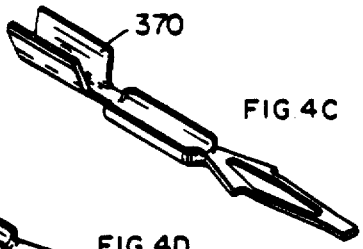
Figure 4D:
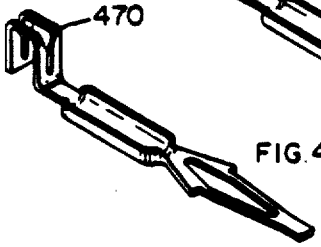

It will be appreciated that the mating portions 60, 70 of the terminals 20 can have any configuration including, but not limited to, pin, receptacle, crimp, and insulation piercing profiles. FIG. 4 shows a terminal having a receptacle 160 as the first mating portion. FIGS. 4A–D show terminals having a pin 170, a receptacle 270, a crimpable portion 370 and an insulation piercing portion, respectively for the second mating portion. The receptacles shown are of the type disclosed in U.S. Pat. No. 3,317,887. The crimpable and insulation piercing portions shown are of the types disclosed in U.S. Pat. Nos. 2,818,632 and 3,760,335 respectively. It is to be understood that these are only representative examples of the various mating portions that can be formed for the mating portions of the terminals. The shoulders 68 can be located on the terminal 20 to accommodate various lengths of filter sleeves. The terminal 20 is preferably stamped and formed from standard metal stock and can be plated if so desired.

The filter sleeves 24 are preferably of the type disclosed in U.S. Pat. No. Re. 29,258, the disclosure of which is incorporated herein by reference.

We claim:

1. A solderless, filtered electrical connector comprising:

a first elongated housing *member* of insulative material defining a forwardly directed mating face, a rearwardly directed cavity, a plurality of passages extending between said cavity and said mating face, [and at least one lateral latching opening,] said housing *member* being plated with a conductive material except in and immediately adjacent said passages;

a second housing *member* of insulative material dimensioned to be received in said cavity of said first housing *member* and having a like plurality of passages extending between forward and rearwardly directed faces[, at least one laterally directed latching lug positioned to engage a respective latching opening in said first housing];

a grounding member of conductive material interposed between said first and second housing members and having a plurality of apertures aligned with the respective [passageways] *passages*, each aperture being profiled by a plurality of inwardly directed tines; and a plurality of filtered terminals each formed by a filter sleeve mounted on a compliant portion of a pin terminal, *said terminals being disposed in said aligned passages and apertures of said housing members and grounding members respectively.*

2. A solderless, filtered electrical connector according to claim 1 further comprising:

a metal member mounted on said mating face of said first housing *member* providing a ground path for said plating.

3. A solderless, filtered electrical connector according to claim 2 further comprising an integral shroud on said metal member, said shroud enclosing said mating face.

4. A solderless, filtered electrical connector according to claim 1 wherein said compliant portion of each said pin terminal comprises a pair of outwardly bowed legs integral at each end and defining a diamond shaped opening therebetween.

*5. A solderless, filtered electrical connector according to claim 1 further comprising*

*latching means for securing said first and second housing members together.*

*6. A solderless, filtered electrical connector according to claim 5 wherein said latching means comprises:*

*at least one latching opening in said first housing member and*

*at least one latching lug on second housing member positioned to engage a respective latching opening in said first housing member.*

*7. An electrical connector, comprising:* housing means including a first dielectric housing member and a second dielectric housing member, said first and second housing members having aligned passageways extending therethrough;

*ground means disposed between said housing members and having apertures aligned with respective aligned passageways, said grounding means including tine means inwardly-directed into respective passageways at said aligned apertures;*

*filter sleeve means disposed in respective passageways and having exterior surfaces electrically engaging said inwardly-directed tine means of said grounding means;*

*electrical terminal means disposed in said passageways and having front contact means, essentially planar compliant contact means and rear contact means, said compliant contact means including compliant leg portions having outwardly facing edge surfaces, said leg portions being in a common plane with the outermost portions of said edge surfaces extending outwardly beyond the diameter of the front contact means, such that upon inserting said front contact means into said filter sleeve means, said leg portions are deflected inwardly along said common plane and said outermost edge portions springably and electrically engaged interior surfaces of respective filter sleeve means; and*

*means securing said housing members together.*

*8. The electrical connector according to claim 7 wherein surfaces of said housing means have shielding means disposed thereon.*

*9. The electrical connector according to claim 7 wherein said securing means comprises latching means including:*

*at least one latching opening in said first housing member and*

*at least one latching lug on second housing member positioned to engage a respective latching opening in said first housing member.*

*10. The electrical connector according to claim 7 wherein said electrical terminal means further includes stop shoulders for locating said filter sleeve means on said electrical terminal means.*

* * * * *

UNITED STATES PATENT OFFICE

CERTIFICATE OF CORRECTION

Patent No. Re: 33,153 Dated January 23, 1990

Inventor(s) Rickie M. Althouse et al.

It is certified that error appears in the above-identified patent and that said Letters Patent is hereby corrected as shown below:

Column 4, claim 7, Line 32 - the word "ground" should be --grounding--.

Signed and Sealed this

Second Day of April, 1991

*Attest:*

HARRY F. MANBECK, JR.

*Attesting Officer*

*Commissioner of Patents and Trademarks*